United States Patent [19]

Easthill

[11] Patent Number: 4,585,926
[45] Date of Patent: Apr. 29, 1986

[54] TEMPERATURE CONTROL AND INDICATING ARRANGEMENT

[75] Inventor: Stephen P. Easthill, Chessington, England

[73] Assignee: U.S. Philips Corporation, New York, N.Y.

[21] Appl. No.: 690,925

[22] Filed: Jan. 11, 1985

[30] Foreign Application Priority Data

Jan. 20, 1984 [GB] United Kingdom ............... 8401506

[51] Int. Cl.[4] .............................................. H05B 1/02
[52] U.S. Cl. .................................... 219/506; 219/501; 340/584; 340/526
[58] Field of Search ............... 219/506, 252, 501, 251, 219/492, 497, 502, 295; 340/526, 584, 588

[56] References Cited

U.S. PATENT DOCUMENTS

| | | | |
|---|---|---|---|
| 2,518,503 | 8/1950 | Sparklin ............................ | 219/251 |
| 3,803,383 | 4/1974 | Fresard et al. ..................... | 219/251 |
| 4,347,430 | 8/1982 | Leicester et al. .................. | 219/497 |

Primary Examiner—M. H. Paschall
Attorney, Agent, or Firm—Rolf E. Schneider

[57] ABSTRACT

A temperature control and indicating arrangement comprises an electric heating element; a thermostat connected in series with the heating element and responsive to the heat generated thereby; and structure responsive to the operation of the thermostat for indicating when the temperature in the region of the thermostat reaches a value determined by the thermostat. Included are a resettable electronic counter; a circuit for resetting the counter each time a power supply is connected to the arrangement; a detector for detecting cyclically repetitive switching operations of the thermostat and for causing the counter to count such operations immediately following each resetting of the counter; and counter-stop circuit for stopping the counter at a given count position corresponding to a count value greater than unity. The indicating structure includes a visual indicator electrically coupled to the counter to provide a visible indication when the counter is in the given count position.

12 Claims, 8 Drawing Figures

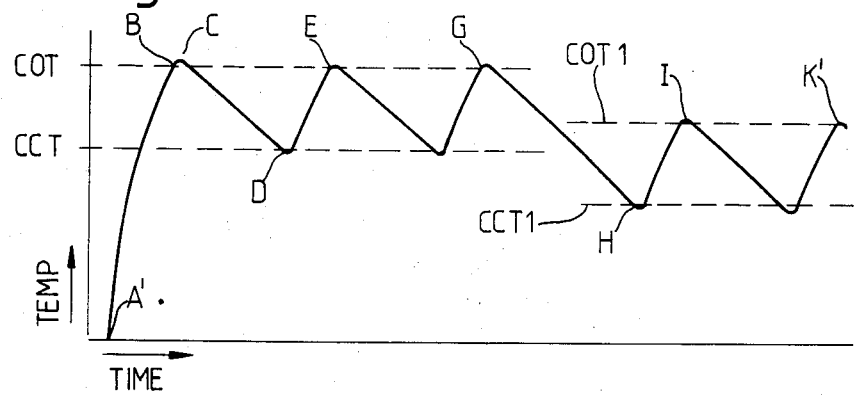
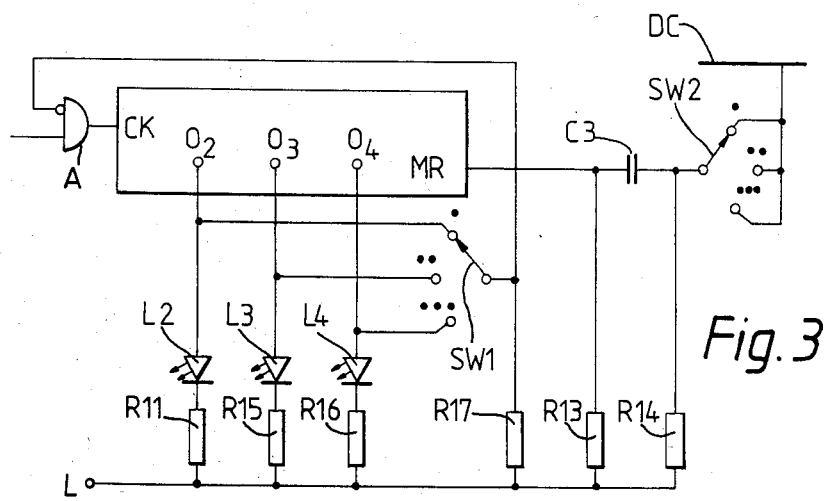
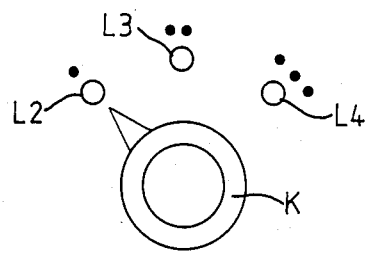
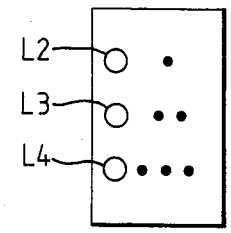

TEMPERATURE CONTROL AND INDICATING ARRANGEMENT

This invention relates to a temperature control and indicating arrangement including an electric heating element, a thermostat in series with said element and responsive to the heat generated thereby, and indicator means which responds to operation of the thermostat to indicate when the temperature in the region of the thermostat reaches a value determined by the thermostat.

Such arrangements are well known and are used, for example, on domestic electrical equipment such as variable-temperature cooking pots, deep fat fryers, toasters, and smoothing irons.

The indicator means is typically a neon lamp connected across the thermostat contacts such that the lamp lights when the contacts are open, i.e. the lamp gives a positive visible indication that the temperature in the region of the thermostat has reached the required value. The heating element is disconnected by the thermostat and this subsequently results in the thermostat contacts re-closing. The lamp is therefore short-circuited and goes out during the re-heating period. The cycle is then repetitive until such time as the thermostat setting is changed or the apparatus is switched off.

Thus for a portion of each of the heating-cooling cycles during which the required average temperature is being maintained, the lamp is not alight and there is no positive indication that the apparatus is in fact at its working temperature. Thus it is not clear whether the apparatus is in its initial warming-up period and is not yet at its working temperature, is at the required temperature, is not switched on, or has a faulty lamp or heating element.

The object of the present invention is at least to mitigate this problem.

Accordingly the invention provides a temperature control and indicating arrangement including an electric heating element, a thermostat connected in series with said element and responsive to the heat generated thereby, and indicator means which responds to operation of the thermostat to indicate when the temperature in the region of the thermostat reaches a value determined by the thermostat, characterised in that the arrangement further includes a resettable electronic counter, a resetting circuit for resetting the counter each time a power supply is connected to the arrangement and, in the case of an arrangement in which the thermostat temperature setting is manually adjusted, each time that the setting is changed during operation, a detector which detects cyclically-repetitive switching operations of the thermostat and causes the counter to count such operations immediately following such resetting of the counter, and a counter-stop circuit arranged to stop the counter at a given count position which corresponds to a count value greater than unity, and in that the indicator means comprises a visual indicator controlled by the counter to give a visible indication when the counter is in said given count position.

The counter of such an arrangement can be used to check that there have been at least two operations of the thermostat and, therefore, that the thermostat is actually cycling at the required temperature, and also to maintain an uninterrupted visual display until the thermostat setting is changed or the apparatus is switched off. The use of a counter however, makes further advantages possible. Either or both of the reset and first count positions can be used to cause a "waiting" indicator to be illuminated. In this manner it can be arranged that a positive indication is given the whole time the arrangement is in use, so that the user will know either that the arrangement is in the process of warming up to the required temperature or that it is satisfactorily maintaining the required temperature.

A further advantage accruing from the use of a counter is that several temperatures may have respective count positions allocated thereto, and these positions may have respective indicators associated therewith. Thus, for example, these temperatures may be those set out in the international standard "iron" symbol, namely 210° C. (HOT), 160° C. (WARM) and 120° C. (COOL). These are represented by three dots, two dots and one dot, respectively, arranged in the symbol representing a smoothing iron. In this case, three indicators could be used either on the basis of an individual indicator for each of the three temperatures or on the basis of one for each dot. In the former case, only one of the three indicators would be illuminated at any one time whereas in the second case either one, two, or all three indicators would be illuminated.

A principal advantage arising from the use of a counter, however, is that counters are manufactured in vast quantities and, hence, can be very inexpensive indeed. This means that an arrangement according to the invention can be added to a relatively low cost apparatus such as a smoothing iron, water heater, or fat fryer with only a small increase in the selling price.

The invention will now be described, with reference to the accompanying drawings, in which:

FIG. 2 shows a time/temperature graph,

FIGS. 3, 6 and 8 show possible modifications of the circuit shown in FIG. 1, and FIGS. 4, 5 and 7 show various layout arrangements for indicator lamps.

FIG. 1 shows a temperature control and indicating circuit having two input terminals L (live) and N (neutral), for a mains voltage supply input, interconnected by a heating element HE in series with a thermostat TH responsive to the heat emitted by the heating element.

Figure 1:
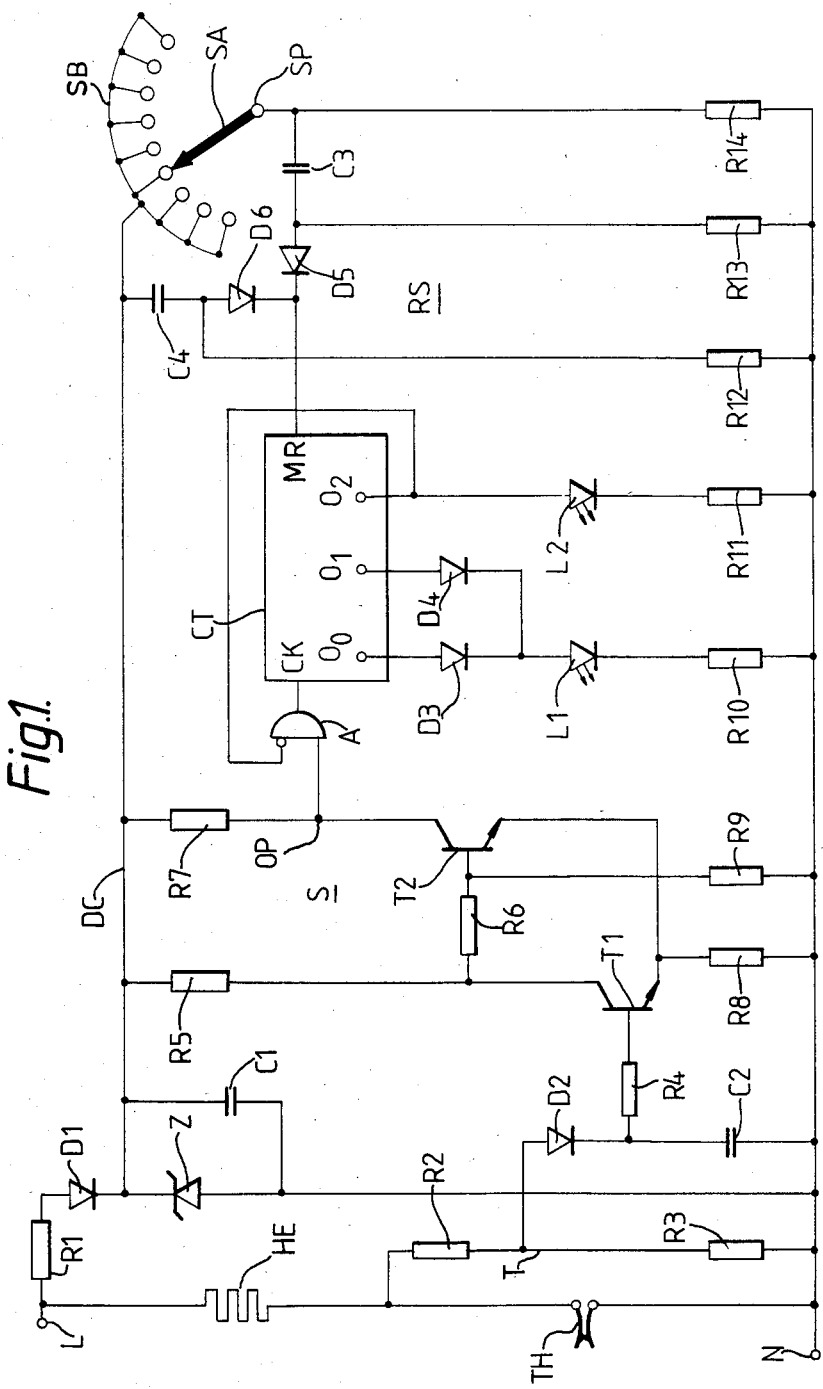
FIG. 1 shows a circuit diagram of a first embodiment of the invention.

A d.c. supply for the electronic components is derived from the mains voltage supply by a rectifying circuit comprising a dropping resistor R1 in series with a diode D1, and a smoothing/regulating circuit comprising a reservoir capacitor C1 and a voltage-regulating zener diode Z which, for example, maintains the voltage on the d.c. rail DC at +15 V with respect to the terminal N (i.e. the neutral rail).

The opening and the closing of the contacts of thermostat TH are detected by a voltage divider R2, R3 connected across the thermostat, the tapping point T of the divider being connected to a rectifying and smoothing circuit comprising diode D2 and capacitor C2. The junction of diode D2 and capacitor C2 is connected via a current-limiting resistor R4 to the base of an input transistor T1 of a conventional Schmitt trigger circuit S comprising transistors T1, T2 and resistors R5 to R9.

The output OP of trigger circuit S is connected to a non-inverting input of an AND-gate A the output of which is connected to the clock input CK of a counter CT. Counter CT has a series of counter outputs $O_0$, $O_1$, $O_2$, and a master reset input MR. When the counter is reset by a positive-going voltage on input MR, a "high" signal, e.g. +15 V with respect to the neutral rail N, appears on counter output $O_0$. The first subsequent "high" signal pulse on input CK causes the counter to step once and provide a "high" signal on output $O_1$. The signal on output $O_0$ simultaneously goes "low"—i.e. to the neutral rail potential. The next pulse at input CK steps the counter to give a "high" signal on output $O_2$.

Output $O_0$ is connected via an isolating diode D3 to a light emitting diode LED L1 in series with a current-limiting resistor R10. Output $O_1$ is connected to the junction point of diode D3 and LED L1 via a further isolating diode D4. Output $O_2$ is connected to a second LED L2 in series with current-limiting resistor R11 and is also connected to the inverting input of AND-gate A.

A reset circuit RS includes a switch bank SB with a rotatable switch arm SA attached to an adjusting spindle SP of the thermostat TH. Rotation of spindle SP sets the thermostat TH to any required temperature in the range which is selectable in this manner. The contacts of switch bank SB are connected in common to the rail DC and are assumed to be sufficiently close that a relatively small rotary adjustment of spindle SP will cause switch arm SA to move from one contact, or from the space between two adjacent contacts, to the next contact.

Switch arm SA is connected to the neutral rail via a resistor R14 and to the reset input MR via a capacitor C3 and a diode D5. The junction of capacitor C3 and diode D5 is connected to the neutral rail via a resistor R13. The positive rail DC is connected to the reset input MR via a capacitor C4 and a diode D6, the junction of C4 and D6 being connected to the neutral rail via a resistor R12.

The operation of the circuit will now be described. When the mains voltage is applied to terminals L and N, the voltage on rail DC rises to +15 V and this is applied as a positive-going pulse to the reset terminal MR via capacitor C4 and diode D6. This pulse resets counter CT and the resulting "high" signal on output $O_0$ illuminates LED L1. This gives the user a positive indication that the device is switched on but is not ready for use since the required temperature has not yet been reached.

Also, on applying the mains voltage to the arrangement, heater element HE is energised via the closed contacts of the thermostat TM which senses the temperature of whatever medium is being heated by the heater.

With the contacts of thermostat TH closed, as shown in FIG. 1, the voltage divider R2, R3 is short-circuited and the voltage applied to the base of transistor T1 is at rail N potential. Transistor T1 is therefore "off" and transistor T2 is therefore "on", with a result that a "low" signal is applied to the non-inverting input of AND-gate A. Gate AND-A is therefore inhibited by the low signal and so the input to counter CT is also low.

It is first assumed that the temperature in the region of the thermostat is lower than the required temperature as determined by the particular setting of switch arm SA. The heating element HE therefore starts to heat the apparatus concerned which may, for example, be an electric smoothing iron, a sandwich or bread toaster, a water heater, a coffee maker, or a fat fryer.

After a period, the temperature in the region of the thermostat reaches the temperature at which the contacts open. The thermal operation for this condition is shown in FIG. 2 in which the ambient starting temperature is shown at instant A and rises with time to the contact opening temperature COT at instant B.

When the contacts of thermostat TH open, the potential across the voltage divider R2, R3 increases substantially to the voltage of the mains supply since the resistance of element HE is low compared with the very high resistance of the divider. This high voltage is reduced by the divider to, for example, approximately +15 V at tapping point T and this is rectified and smoothed by the D2, C2 combination to provide a d.c. voltage at the base of transistor T1 sufficient to cause the Schmitt trigger S to trigger and, hence, to provide a "high" signal at point OP and at the non-inverting input of AND-gate A. As explained above, counter CT was reset to zero (a "high" on output $O_0$) when the mains supply was first applied, and therefore the "low" output signal on output $O_2$ enables the AND-gate A via its inverting input. Thus the "high" signal at point OP causes the counter CT to step once to give a "high" signal on output $O_1$ and a "low" signal on output $O_0$. LED L1 continues to give a positive signal because it is now provided with its illuminating voltage from output $O_1$ instead of output $O_0$.

Referring again to FIG. 2, the temperature in the region of the thermostat continues to rise for a while due to the thermal capacity of the body being heated. In the case of an electric smoothing iron, for example, the body being heated—namely the sole plate—is required to have a relatively high thermal capacity and there is a delay between the instant B at which the heating element is switched off and the instant C at which the temperature in the region of the thermostat begins to fall.

The temperature then falls to the contact closing temperature CCT, at a relatively slower rate due to the thermal capacity, until at instant D the thermostat contacts close again to restart the heating cycle. The voltage at point T drops to zero and the Schmitt trigger S resets and removes the "high" signal at the input to AND-gate A.

The temperature now increases until, at instant E, the thermostat contacts re-open. As explained above, this causes the output at point OP of Schmitt trigger S to become "high" and counter CT moves to the next count value. The "low" signal at output $O_1$ of counter CT now causes the illuminated LED L1 to be extinguished and the "high" signal now on output $O_2$ illuminates the LED L2. This provides a positive indication to the user that the arrangement is now satisfactorily cycling at the required temperature.

The "high" signal on output $O_2$, via the inverting input of AND-gate A, inhibits the AND-gate and prevents any further stepping of the counter prior to the next reset pulse on input MR. Thus although the thermostat contacts continue to cycle, a steady indication that the arrangement is at the required working temperature is given to the user.

It is to be particularly noted that at least one complete operating cycle of the thermostat must be performed before LED L2 can be illuminated. This is a clear distinction over the known system having an indicator lamp shunted by the thermostat since the known system can give a false indication under some circumstances. Thus in the known system, the lamp is illuminated at instant B. If however, the thermostat contacts fail to close at instant D, for example due to pollution or dust, the arrangement cools to room temperature but the indicator lamp still indicates that the arrangement is at the required working temperature. In the arrangement described, however, the thermostat contacts must open and reclose at least once before LED L2 can be illuminated. The first reclosure at instant D is the one most prone to faulty operation—once the thermostat has satisfactorily completed its first operating cycle, faulty operation in any succeeding cycle is extremely rare. Thus in the event of a faulty contact, LED L2 will not light until the fault is cleared or clears itself.

It will, of course, be clear that, if counter CT is provided with further outputs the use of this counter enables further cycles to be counted before illuminating LED L2, if required, simply be removing the connection from counter output $O_2$ and reconnecting it to a further output, (not shown). In this case, $O_2$ could then be connected to LED L1 via a further respective isolating diode. LED L2 would then be illuminated at instant G, i.e. one cycle later.

In some systems, the indication by LED L1 that the arrangement is "on" and is warming up may not be needed. Certainly an arrangement as described reduces the need for such an indication since LED L2 is illuminated—and remains illuminated—only when and so long as the arrangement is at the working temperature. Thus the ambiguity of the known system—i.e. that if the lamp is not illuminated then the user does not know whether the arrangement is warming up or is usable—does not exist.

In another known system, the indicator lamp is connected across the heater element and so its operation is the reverse of the known system hitherto referred to. It will be appreciated that the former indicator lamp operation also gives rise to an ambiguous indication, namely that if the lamp is illuminated, it is not known whether the arrangement is ready to use or is being heated to the required temperature.

It will now be assumed that the user readjusts spindle SP to reset the thermostat such that its contacts open and close at lower temperatures COT1 and CCT1 respectively.

If, immediately prior to the readjustment of spindle SP, switching arm SA is resting on a contact of the switching bank SB, then capacitor C3 is charged via resistor R13 such that it has the full +15 V of rail DC on one electrode. Movement of the spindle in either direction removes the positive rail voltage and capacitor C3 is discharged via resistors R13 and R14. This is the state that exists if the switching arm SA were between two contacts immediately prior to the re-adjustment. On further slight movement, the switching arm SA contacts a bank contact and capacitor C3 is charged to the DC rail voltage and this causes a positive-going pulse to be applied to the reset input MR of the counter CT. In this manner, any readjustment of the temperature setting causes counter CT to be reset and, hence, LED L2 to be extinguished and LED L1 to be illuminated. This gives an unambiguous indication that the arrangement is not yet at the required working temperature.

As shown in FIG. 2, it is assumed that the thermostat is adjusted just after the instant G when the thermostat contacts close. The temperature consequently falls until, at instant H, the temperature CCT1 is reached and the contacts close. The temperature cycling then continues as described above, with counter CT being stepped to position $O_1$ at instant 1 and finally the position $O_2$ at instant K'.

In this manner, a visual indication that the arrangement is at the working temperature is not given until it is in fact cycling at the required temperature. This, again, is in contrast to the first known arrangement mentioned above in which the indicator lamp would be illuminated at instant G when, in fact, the arrangement has not reached the working temperature. Thus a false indication is given for a period in addition to the on-off sequencing of the lamp thereafter. A similarly false indication would be given by the second known arrangement mentioned above.

In the embodiment shown in FIG. 1, it is assumed that the spindle SP is smoothly rotatable between its end limits; that is to say that the switching arm SA can rest at any arbitrary point on or between contacts. Preferably, however, the adjustable switch is of the well-known click-step type in which the switching arm SA always rests on a contact after adjustment, that is to say that if the user releases the spindle when the switching arm is between two contacts, a pin-and-spring mechanism automatically moves the arm to the nearest contact position.

Such a switching arrangement allows a considerable saving of components, namely capacitor C4, diodes D5 and D6, and resistor R12. Capacitor C3 is thus connected directly between the switching arm SA and the reset input MR. Since switching arm SA must always rest on a contact of the switching bank SB, then capacitor C3 always charges when power is first applied and, hence, resets the counter. This eliminates the need for the separate capacitor C4 required for the purpose as well as the two capacitor-isolating diodes D5 and D6 and the charging resistor R12.

The use of a counter to count the cyclically-repetitive operation of the thermostat is particularly advantageous in enabling separate indications to be given when the arrangement is required to operate at any one of a number of different selectable temperatures such as the 'one-dot', 'two-dot', and 'three-dot' temperatures of the international standard referred to above.

FIG. 3 accordingly shows one example of a multitemperature indicating arrangement. FIG. 3 only shows the relevant parts of the arrangement which differ from those shown in FIG. 1, the remaining parts of the circuit being the same as shown in FIG. 1.

In addition to LED L2, two further LEDs L3 and L4 are provided which are respectively connected to outputs $O_3$ and $O_4$ of counter CT. The thermostat is adjustable to any one of three temperatures and includes two ganged 3-position switches SW1 and SW2 coupled thereto such that the thermostat switches at 120° C. when the switch is in the one-dot position, 160° C. when in the two-dot position, and 210° C. when in the three-dot position.

The one-dot, two-dot, and three-dot contacts of switch SW1 are connected to outputs $O_2$, $O_3$, and $O_4$ respectively of counter CT, these outputs being respectively connected to LED L2 and to two additional LEDs L3 and L4 which are connected to the neutral rail via respective resistors R15 and R16. The arm of switch SW1 is connected to the inverting input of AND-gate A and also to the neutral rail via a resistor R17. In each of its three positions, switch SW2 connects capacitor C3 to the DC rail.

Since switch SW2 connects capacitor C3 to the power rail, counter CT is always reset automatically in the manner described above when power is applied. Similarly, the counter is reset each time the setting of the switch SW2 is changed.

With switches SW1 and SW2 set to the one-dot position, the circuit for counter CT and LED L2 is the same as that shown in FIG. 1 with the exception of the additional pull-down resistor R17 which holds the inverting input of AND-gate A at the N rail potential whilst the switch position is being changed. Thus with the switch in the one-dot position, the arrangement operates in the manner described above and LED L2 is illuminated to indicate that the thermostat is satisfactorily cycling at the required temperature of 120° C.

If the ganged switch SW1/SW2 is now moved to the two-dot position, counter CT is reset by switch SW2 as described above and then counts the operating cycles of thermostat TH. Counter CT then illuminates LED L2 as described above but can now take a further count step to illuminate LED L3, whereupon further counting is inhibited by the "high" signal on output $O_3$ of the counter being applied via switch SW1 to the AND-gate A. LED L3 therefore remains illuminated, and the arrangement cycles at the required temperature (160°) until the position of switches SW1 and SW2 is changed or until the power supply is removed.

If the switches are set to the three-dot position, representing a temperature of 210° C., then counter CT counts a further step to illuminate LED L4 when the arrangement is cycling satisfactorily. LEDs L2 and L3 light in turn during the counting, of course.

In this embodiment, only one of the three LEDs L2, L3, and L4 can be on at any one time and then only if the working temperature is that determined by the selected setting of the thermostat. FIG. 4 shows one way in which the lamps could be arranged around a rotatable adjusting knob K which controls the switches and the thermostat setting and can be set to any one of the three 'dot' settings. The LEDs are arranged so that each one is adjacent a respective position of the knob pointer which indicates the particular 'dot' temperature. This layout gives a particularly easily-read indication to the user that the apparatus concerned, for example a smoothing iron, is operating at the selected temperature. In this case, the LED L1 of FIG. 1 is not necessary but can, of course, be provided if required in any arrangement in accordance with the invention.

An alternative layout arrangement is shown in FIG. 5 in which each of the LEDs L2, L3 and L4 located on a panel adjacent its respective 'dot' temperature indication.

Figure 6:
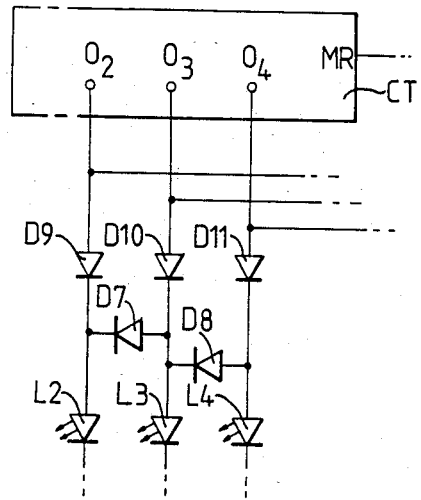

It is alternatively possible to arrange that the number of LEDs illuminated at any one time corresponds with the number of dots representing the particular temperature at which a smoothing iron is operating. An example of such an arrangement is shown in FIG. 6 which only differs from FIG. 3 in that additional diodes D7 to D11 have been added. With a "high" signal on output $O_2$, LED L2 is illuminated as before, though it is now in series with isolating diode D9. With a "high" signal on output $O_3$, LED L3 is illuminated via diode D10 and LED L2 is illuminated via diodes D10 and D7. In a similar manner, a "high" signal on output $O_4$ will illuminate LED L4 via diode D11, LED L3 via diodes D11 and D8 in series, and LED L2 via diodes D11, D8 and D7 in series.

Figure 7:
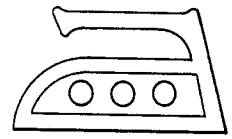

It can be appreciated that in this arrangement the number of lamps illuminated at any one time corresponds to the number of dots in the international standard for electric irons at which the arrangement is operating. Several alternative layouts for the LEDs are of course possible, but a particularly clear layout is shown in FIG. 7 in which the LEDs form part of the international symbol for ironing temperatures. The three 'dots' of the symbol, shown as circles within the iron representation in FIG. 7, are the three LEDs of FIG. 6. LEDs L2, L3, and L4 could be arranged in sequence from left to right, for example, or LED L2 may be the central LED. In the latter case, a closer representation of the symbol for the one-dot temperature is obtained—i.e. the illuminated dot is central in the iron symbol.

Figure 8:
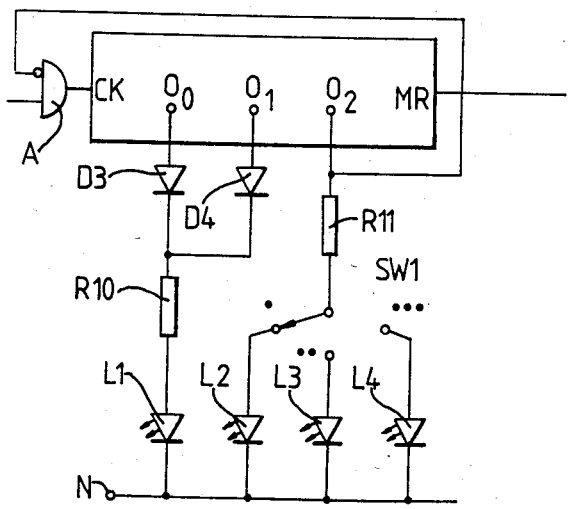

In some embodiments, it may be preferred to illuminate only one LED when the arrangement is cycling satisfactorily instead of the three LEDs in turn as in the embodiment given in FIG. 3. FIG. 8 shows one way in which this can be achieved, namely that only one output of counter CT is used to illuminate the required LED and the LED concerned is selected by the switch SW1. The remaining parts of the circuit are as given in FIG. 1 modified by FIG. 3.

In this embodiment, LED L1 has also been added as in FIG. 1 so that, say, a red "not ready" lamp (LED L1) is illuminated when the arrangement is warming up and a respective green "ready" lamp is illuminated for the particular one of the three (or more) available temperatures.

It will be appreciated that as many temperatures can be indicated as are required and this is limited only by practical considerations such as the cost and the number of indicators that can conveniently be provided. In the case of an electric smoothing iron, only three temperatures are required to cover the whole of the required ironing range and so no more than three indicators (apart from a "waiting" indicator L1 if required) are desired. In other cases, such as so-called water cookers in which the cooking is effected by water at a selected one of a number of temperatures, a larger number may be required. In the case of washing machines, the wash water may be controlled at any one of a plurality of temperatures—again as covered by the international washing standard. An arrangement according to the invention can be used to provide a visual indication of when the wash water is heated to the specified temperature. In general, it may be preferable to have a single "ready" indicator, as in the embodiment shown in FIG. 1, if more than three fixed temperatures, or a variable temperature, is required.

Any convenient form of visual indicator may, of course, be used but there is a preference for LEDs because of their low current and voltage requirements, low price, small size, and good visibility. Other forms may, of course, alternatively be used—such as filament lamps (pea-bulbs) or neon indicators. The former require too high a current and the latter require too high a voltage to allow them to be driven directly from the majority of integrated circuit counters, however.

The counter used in various practical embodiments is an integrated circuit HEF4017B, available from Mullard Limited, which also includes the AND-gate A of FIGS. 1 and 3. Suitable LEDs for L1 and L4 are, for example, Mullard Type CQW10A (Red) and suitable values for the components shown in the embodiments are:

Resistors (kiloohms)

-continued

| | | |
|---|---|---|
| R1-12 | R2-43 | R3-3 |
| R4-12 | R5-30 | R6-20 |
| R7-30 | R8-68 | R9-3.3 |
| R10-6 | R11-6 | R12-100 |
| R13-100 | R14-100 | R15-6 |
| R16-6 | R17-100 | |
| | Capacitors | |
| C1-100 mF | C2-150 nF | C3-100 pF |
| C4-100 pF | | |

Although the embodiments shown in FIGS. 1 and 3 function on "high" signals, it is well known to those in the art that it could equally well be arranged to operate on "low" signals or on the falling or rising edge of the waveform. Thus it is equally possible to cause the counter CT to respond to the closing of the thermostat contacts or even, if required, to both the opening and the closing of the contacts. This latter arrangement is not, in general, to be preferred since it requires that the LEDs are connected to higher count outputs, which may be unnecessarily wasteful for some practical purposes. The particular counter used in the embodiments, however, namely Mullard Type HEF4017, is a 10-count ring cunter and can be used for higher count values if required; for example to count a higher number of thermostat cycles before a "ready" indicator is operated.

I claim:

1. A temperature control and indicating arrangement, which comprises an electric heating element; a thermostat connected in series with said heating element and responsive to the heat generated thereby; means responsive to the operation of the thermostat for indicating when the temperature in the region of the thermostat reaches a value determined by the thermostat; a resettable electronic counter; circuit means for resetting the counter each time a power supply is connected to the arrangement; means for detecting cyclically repetitive switching operations of the thermostat and for causing the counter to count said operations immediately following each resetting of the counter; and counter-stop circuit means for stopping the counter at a given count position corresponding to a count value greater than unity; the indicating means including a visual indicator electrically coupled to the counter to provide a visible indication when the counter is in said given count position.

2. An arrangement according to claim 1, in which the resetting circuit means includes means for resetting the counter each time the temperature setting of the thermostat is adjusted during operation of the arrangement.

3. An arrangement according to claim 1, in which the given count position is selectable from a plurality of count positions, and in which the indicating means includes a visual indicator respectively associated with each count position and electrically coupled to the counter to provide a visible indication when the counter is in the corresponding count position.

4. An arrangement according to claim 3, in which the thermostat is adjustable over a range of temperatures and is provided with switching means for selecting particular count positions corresponding to respective temperature settings.

5. An arrangement according to claim 4, in which the counter-stop circuit means includes said switching means.

6. An arrangement according to claim 1, which includes a further visual indicator associated with the zero count position to provide a visible indication when the counter is in the zero count position.

7. An arrangement according to claim 6, in which the further visual indicator also provides a visible indication when the counter is in the count position corresponding to a count value of unity.

8. An arrangment according to claim 1, in which the detecting means includes a voltage divider connected in parallel with the thermostat.

9. An arrangement according to claim 8, in which the resettable electronic counter includes a clock input and a plurality of counter outputs, and in which the counter-stop circuit means includes an AND gate having an output electrically connected to the clock input and also having a first input and a second input, the second input being electrically connected to one of the counter outputs.

10. An arrangement according to claim 9, in which the detecting means further includes a bistable multivibrator having an output electrically connected to the first input of the AND gate.

11. An arrangement according to claim 10, in which the bistable multivibrator comprises a Schmitt trigger circuit.

12. An arrangement according to claim 11, in which the detecting means further includes a rectifying and smoothing circuit electrically coupled between the voltage divider and an input of the Schmitt trigger circuit.

* * * * *